US012484868B2

United States Patent
Koehler et al.

(10) Patent No.: US 12,484,868 B2
(45) Date of Patent: Dec. 2, 2025

(54) LUNG DIAGNOSIS USING DYNAMIC X-RAY IMAGING

(71) Applicant: KONINKLIJKE PHILIPS N.V., Eindhoven (NL)

(72) Inventors: Thomas Koehler, Hamburg (DE); Rafael Wiemker, Hamburg (DE); Cornelis Petrus Hendriks, Eindhoven (NL); Michael Polkey, London (GB); Joerg Sabczynski, Hamburg (DE); Roberto Buizza, Eindhoven (NL); Jaap Roger Haartsen, Best (NL)

(*) Notice: Subject to any disclaimer, the term of this patent is extended or adjusted under 35 U.S.C. 154(b) by 0 days.

(21) Appl. No.: 18/671,325

(22) Filed: May 22, 2024

(65) Prior Publication Data
US 2025/0025119 A1 Jan. 23, 2025

Related U.S. Application Data

(60) Provisional application No. 63/527,855, filed on Jul. 20, 2023.

(51) Int. Cl.
A61B 6/46 (2024.01)
A61B 6/00 (2006.01)
A61B 6/50 (2024.01)

(52) U.S. Cl.
CPC ........... *A61B 6/463* (2013.01); *A61B 6/50* (2013.01); *A61B 6/5217* (2013.01); *A61B 6/5294* (2013.01)

(58) Field of Classification Search
None
See application file for complete search history.

(56) References Cited

U.S. PATENT DOCUMENTS

| 2003/0190010 A1* | 10/2003 | Tsuji | G16H 50/30 378/23 |
| 2013/0156267 A1* | 6/2013 | Muraoka | A61B 6/5217 382/103 |
| 2015/0379706 A1 | 12/2015 | Leonhardt | |
| 2017/0278238 A1* | 9/2017 | Noji | A61B 6/486 |
| 2018/0260953 A1* | 9/2018 | Matsutani | G06T 7/0012 |

(Continued)

FOREIGN PATENT DOCUMENTS

JP 2015043894 A * 3/2015

OTHER PUBLICATIONS

English translation of JP 2015043894 (Year: 2015).*

(Continued)

*Primary Examiner* — Katherine L Fernandez
(74) *Attorney, Agent, or Firm* — Daniel H. Brean (57) ABSTRACT

A medical imaging device includes a display device; and at least one electronic processor programmed to perform an imaging method including controlling an associated medical imaging device to acquire a dynamic lung image including a time sequence of lung images depicting at least one lung of the patient; separating the dynamic lung image into a dynamic respiration image depicting density changes due to respiration and a dynamic perfusion image depicting density changes due to lung perfusion; at least one of: (i) generating a respiration delay image based on the dynamic respiration image; and (ii) generating a perfusion delay image based on the dynamic lung perfusion image; and displaying the respiration delay image and/or lung perfusion delay image on the display device.

15 Claims, 4 Drawing Sheets

(56) References Cited

U.S. PATENT DOCUMENTS

2018/0260955 A1\* 9/2018 Matsutani ................ G06T 7/38
2020/0118270 A1 4/2020 Matsutani
2020/0327665 A1 10/2020 Shimamura

OTHER PUBLICATIONS

Tanaka et al., "Pulmonary Function Diagosis Based on Respiratory Changes in Lung Density with Dynamic Flat-Panel Detector Imaging, An Animal-Based Study", Investigative Radiology, vol. 53, No. 7, pp. 417-423, Jul. 2018. (Year: 2018).\*
International Search Report for PCT/EP2024/069576 filed Jul. 11, 2024.
Gutierrez, G. "A novel method to calculate compliance and airway resistance in ventilated patients," Intensive Care Medicine Experimental, vol. 10, No. 55 (2022).
Nair, G.B. et al., "Dynamic lung compliance imagining from 4DCT-derived volume change estimation", Physics in Medicine & Biology, vol. 66, No. 21, (2021).
Hata, A. et al., "Dynamic Chest X-Ray Using a Flat-Panel Detector System: Technique and Applications", Korean J Radiol 2021;22(4):634-651, https://doi.org/10.3348/kjr.2020.1136.

\* cited by examiner

LUNG DIAGNOSIS USING DYNAMIC X-RAY IMAGING

CROSS-REFERENCE TO RELATED APPLICATIONS

This patent application claims the priority benefit under 35 U.S.C. § 119(e) of U.S. Provisional Application No. 63/527,855, filed on Jul. 20, 2023, the contents of which are herein incorporated by reference.

The following relates generally to the medical imaging arts, pulmonary imaging arts, medical image processing arts, pulmonary image processing arts, medical imaging driven medical diagnostic and treatment guidance arts, medical imaging driven pulmonary diagnostic and mechanical ventilation therapy arts, and related arts.

BACKGROUND

A quantitative and spatially resolved assessment of the lung's ventilation and perfusion is desired to optimize the ventilator settings and other therapy parameters in mechanically ventilated patients. Usually, the aim is to match ventilation and perfusion (sometimes referred to in the art as V-Q matching) as ventilation and perfusion are both important for proper gas exchange in the alveoli. For example, if a region of the lung is well ventilated but poorly perfused with blood, then gas exchange will be limited in that region by the poor perfusion. Conversely, a region that is well perfused but poorly ventilated will have gas exchange limited by the poor ventilation. V-Q matching thus improves lung efficiency.

Ventilation and perfusion imaging can be done using imaging modalities such as computed tomography (CT), positron emission tomography (PET), magnetic resonance imaging (MRI), electrical impedance tomography (EIT) or scintigraphy. However, these techniques are not well suited to be used in the intensive care unit (ICU) due to workflow issues. For example, CT, PET, and MRI systems are typically stationary, so that the patient needs to be moved to the radiology department. Scintigraphy requires a radioactive contrast agent, which requires careful handling and specially trained operators. Although EIT can be used in the ICU, it has a much lower resolution than the other modalities mentioned.

Recently, the technique of dynamic X-ray imaging has emerged to address this task. As the lung inflates during inhalation, the average density of lung tissue decreases. By tracking the attenuation of image regions during the respiratory cycle, the local ventilation can be estimated. This technique is sometimes referred to as ventilation imaging and can provide spatially resolved information on air flow within the lungs. In a similar manner, perfusion imaging can be performed to provide spatially resolved information on pulmonary blood flow in the lungs: In the systolic phase of the cardiac cycle, blood is flowing into the lung tissue, leading to an increased density of the lung tissue, while during the diastolic phase blood flows out of the lung tissue leading to decreased density. By tracking the attenuation during the cardiac cycle, the local perfusion can be estimated. However, besides ventilation and perfusion imaging, there is also a need to assess mechanical parameters of the lungs and the pulmonary vessel tree, i.e., about their resistance and compliance. This can be obtained for the case of lung compliance globally using a breath-hold maneuver (see, e.g., G. Gutierrez, "A novel method to calculate compliance and airway resistance in ventilated patients," Intensive Care Medicine Experimental volume 10, number: 55 (2022). However, it is preferred to obtain this information spatially resolved, which requires currently dedicated measurements like 4D CT (see, e.g., G. B. Nair et al., "Dynamic lung compliance imaging from 4DCT-derived volume change estimation", Physics in Medicine & Biology, Volume 66, Number 21, https://iopscience.iop.org/article/10.1088/1361-6560/ac29ce/pdf). Evidently, 4D CT is typically not feasible as a bedside imaging technique. Particularly in the case of mechanically ventilated patients (who are prime candidates to benefit from ventilation and perfusion imaging), transport of the mechanically ventilated patient to and from the radiology department is cumbersome.

The following discloses certain improvements to overcome these problems and others.

SUMMARY

In one aspect, a medical imaging device includes a display device; and at least one electronic processor programmed to perform an imaging method including controlling an associated medical imaging device to acquire a dynamic lung image including a time sequence of lung images depicting at least one lung of the patient; separating the dynamic lung image into a dynamic respiration image depicting density changes due to respiration and a dynamic perfusion image depicting density changes due to lung perfusion; at least one of: (i) generating a respiration delay image based on the dynamic respiration image; and (ii) generating a perfusion delay image based on the dynamic lung perfusion image; and displaying the respiration delay image and/or lung perfusion delay image on the display device.

In another aspect, a lung imaging method includes controlling an X-ray imaging device to acquire a dynamic X-ray lung image including a time sequence of X-ray lung images depicting at least one lung of a patient; separating the dynamic lung image into a dynamic respiration image depicting density changes due to respiration and a dynamic perfusion image depicting density changes due to lung perfusion; at least one of: (i) generating a respiration delay image based on the dynamic respiration image; and (ii) generating a perfusion delay image based on the dynamic lung perfusion image; and displaying the respiration delay image and/or lung perfusion delay image on a display device.

One advantage resides in providing improved dynamic X-ray imaging (e.g., perfusion and/or ventilation imaging) of a patient.

Another advantage resides in providing for bedside dynamic X-ray imaging with enhanced diagnostic value.

Another advantage resides in providing a stiffness metric of a patient's lung at a start of inspiration or a start of expiration.

Another advantage resides in determining a breathing effort of a patient and a ventilator effort of the patient undergoing mechanical ventilation therapy.

Another advantage resides in determining resistance and compliance parameters of lungs without using breath hold maneuvers or four-dimensional computed tomography (4D CT).

A given embodiment may provide none, one, two, more, or all of the foregoing advantages, and/or may provide other advantages as will become apparent to one of ordinary skill in the art upon reading and understanding the present disclosure.

BRIEF DESCRIPTION OF THE DRAWINGS

The disclosure may take form in various components and arrangements of components, and in various steps and arrangements of steps. The drawings are only for purposes of illustrating the preferred embodiments and are not to be construed as limiting the disclosure.

FIG. 1 diagrammatically shows an imaging system in accordance with the present disclosure.

DETAILED DESCRIPTION

As used herein, the singular form of "a," "an," and "the" include plural references unless the context clearly dictates otherwise. As used herein, statements that two or more parts or components are "coupled," "connected," or "engaged" shall mean that the parts are joined, operate, or co-act together either directly or indirectly, i.e., through one or more intermediate parts or components, so long as a link occurs. Directional phrases used herein, such as, for example and without limitation, top, bottom, left, right, upper, lower, front, back, and derivatives thereof, relate to the orientation of the elements shown in the drawings and are not limiting upon the scope of the claimed invention unless expressly recited therein. The word "comprising" or "including" does not exclude the presence of elements or steps other than those described herein and/or listed in a claim. In a device comprised of several means, several of these means may be embodied by one and the same item of hardware.

In techniques of dynamic x-ray imaging, a time series of x-ray images of one or both lungs is temporally low-pass filtered (to suppress the effect of perfusion) and elastically registered. The next step is a pixel-wise analysis of the attenuation over the respiratory cycle. The maximum slope of the intensity versus time curve is selected for each pixel as a surrogate for ventilation (more precisely, it is the maximum air inflow or outflow). This approach provides image contrast based on the maximum rate of change in intensity. However, it does not retain information about the timing. For example, the time from a reference point, such as start of inspiration, and the time at which the maximum rate of change in intensity is observed, is not retained.

Embodiments disclosed herein utilize this timing information. As recognized herein, utilization of the timing can provide important information that is not retained in typical dynamic x-ray imaging. The disclosed system, in one illustrative embodiment, is configured to perform a dedicated analysis on the dynamic x-ray image series to derive mechanical parameters. Compliance and resistance of the bronchial tree and lung tissue can influence the timing of the attenuation curve. Qualitatively, a high compliance and resistance leads to a delay of the pressure wave (i.e., the time between the onset of the breathing cycle and the time of maximum air inflow is longer compared to a rather stiff lung with low compliance and low resistance). Similarly, for perfusion cases, compliance and resistance of the pulmonary vessel tree impact the timing of the maximum inflow of blood into the lung parenchyma.

In some embodiments, the timing information is shown as a map (i.e., an image). The onset of inspiration or expiration is most conveniently derived directly from the mechanical ventilation (MV) device. In this embodiment, the result is provided in a qualitative way, and it is up to a physician to assess and interpret the images (e.g., by looking at left-right symmetry) or changes of the image over time. Similarly for perfusion, the onset of the systole and diastole can be derived either from an external device like an electrocardiogram (ECG) or from the image series itself, e.g., by tracking the heart wall.

Dynamic x-ray imaging including timing information as disclosed herein can also be used in non-ventilated patients. In this case, the onset of inhalation and exhalation can, for example, be determined from the image series as the point where the diaphragm reaches it most cranial or most caudal position.

In some embodiments, to measure a time delay in a noise-robust way, the phase (i.e., time-shift) of the highest cross-correlation for each [registered/smoothed] pixel with the root of the pulmonary artery (right cardiac ventricle) is encoded into each pixel. This phase indicates the time delay from cardiac output to the lung location. (An intensity time curve governed by the cardiac cycle is expected for each pixel, but with certain delays, which can numerically be detected by cross-correlating the curves with exhaustive search over all reasonable delays, i.e., phase shifts).

In optional embodiments, an accuracy of the measurement and robustness against noise and small signal amplitude is increased by utilizing cross-correlation of the time-intensity function for each pixel over multiple respiratory and cardiac cycles, as aligned using external ECG or MV signal.

From repetitive measurements, the disclosed system may automatically derive trend-maps, i.e., maps highlighting areas where the compliance increased or decreased over time. Trends on the scale of days or maybe weeks (usually a hospitalized patient) can be analyzed.

In some embodiments, a biomechanical model (i.e., a digital twin) is used to obtain quantitative information. Preferably, this model is first set up using a 4D CT scan, which provides three-dimensional (3D) information of compliance and resistance as baseline. Additionally, the results of a dynamic x-ray series are calibrated to this baseline. In subsequent dynamic x-ray acquisitions, the observed changes can be modelled with the digital twin to obtain estimates for quantitative values of the compliance and resistance.

Figure 1:
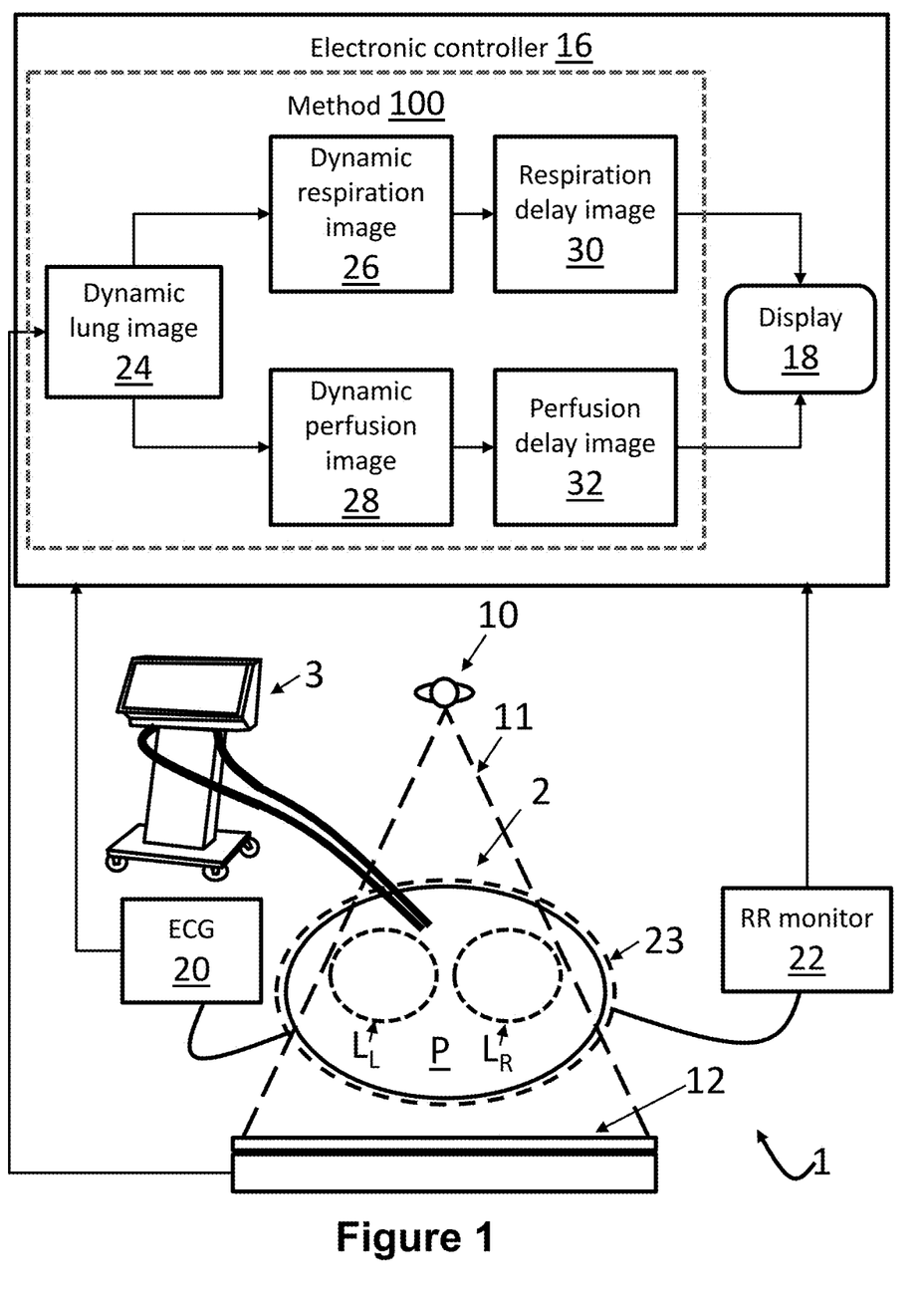

With reference to FIG. 1, a nonlimiting illustrative example of such a medical imaging system 1 is diagrammatically shown. The medical imaging system 1 is an X-ray imaging device. As shown in FIG. 1, the X-ray imaging system 1 includes an array of X-ray source 10 arranged to emit x-rays 11 into an examination region 2, and an X-ray detector array 12 arranged to detect the X-rays emitted by the X-ray source 10 after passing through the examination region 2. During operation to acquire imaging data of a patient P or other imaging subject, that imaging subject P is disposed in the examination region 2. In the illustrative system 1, the X-ray source 10 can be mounted on an overhead beam or the like, and the X-ray detector 12 can be a flat panel X-ray detector plate that is placed underneath the patient P, for example in a slot built into the patient's bed (not shown) or underneath the bed, or the patient may be lifted up temporarily so the X-ray detector 12 can be inserted between the patient and the bed. This arrangement provides a single view of one or both of the left lung $L_L$ and/or the right lung $L_R$ of the patient P, along the anterior-posterior direction.

The X-ray imaging system 1 in some embodiments constitutes a bedside imaging system 1 (for example, with a gantry mounted on wheels, not shown) that can simultaneously image both lungs L (that is, both the left lung $L_L$ and the right lung $L_R$) of the patient P. In other embodiments (not shown), the X-ray system could comprise a computed tomography (CT) scanner, or a C-arm imaging system, that is, with the X-ray source 10 disposed on one end of the C-arm and the X-ray detector array 12 disposed on the opposite end. In such a C-arm configuration, the C-arm can be movable to provide different views of the patient, thus allowing imaging to be performed at multiple views provided by movement of the C-arm. In some examples, the X-ray imaging system 1 may also be a dynamic tomosynthesis system.

With continuing reference to FIG. 1, the X-ray detector array 12 is in electronic communication with an electronic device controller 16, such as a workstation computer, a server computer, or more generally a computer. Images produced by the medical imaging system 1 via the X-ray radiation 11 generated by the X-ray sources 10 are processed by the device controller 16. For example, in a common configuration the device controller 16 is provided for controlling the imaging device 1 to perform image acquisition. The device controller 16 includes an electronic processor (e.g., a microprocessor), and may in some embodiments include at least one user input device (e.g., a mouse, a keyboard, a trackball, and/or the like-all of which are not shown) for user control of the X-ray imaging system 1. A display device 18 (e.g., an LCD display, plasma display, cathode ray tube display, and/or so forth) provides for displaying X-ray images acquired by the X-ray imaging system 1, and/or for displaying processed images therefrom such as lung perfusion and/or ventilation images, and also displays respiration delay images and/or perfusion delay images generated as disclosed herein.

In some embodiments, one or more sensors can be attached to the patient P. The one or more sensors can include, for example, an ECG sensor 20 to generate an image sequence containing principally ventilation information. The ECG sensor 20 can be electronically connected to the electronic processor via one or more electronic components (not shown in FIG. 1 for clarity) and configured to acquire ECG and/or heart rate (HR) data of the patient P. In another example, a respiration rate (RR) monitor 22 can be attached to the patient via a belt 23. The RR monitor 22 can be electronically connected to the electronic processor via one or more electronic components (not shown in FIG. 1 for clarity). For mechanically ventilated patients, the RR data are provided in some embodiments by the mechanical ventilator 2. In some examples, respiration rate (RR) data from a RR monitor 22 connected to the patient P can be used to determine a respiratory cycle of the patient. To this end, as shown in FIG. 1, the one or more sensors are attached to the patient P while the X-ray imaging data is acquired. It is noted that the sensors 20, 22 are optional—in some embodiments the respiratory and/or cardiac cycling information is obtained from other sources, such as analysis of acquired X-ray images or, in the case of respiratory data, from an optional mechanical ventilator 3 that is providing mechanical ventilation therapy to the patient P.

The X-ray imaging system 1 acquires a dynamic lung image 24 comprising a time sequence of lung images depicting at least one lung of the patient. The sequence of lung images of the dynamic lung image 24 are acquired with a high enough acquisition rate to track lung respiration and (if perfusion data is desired) to also track lung perfusion. Lung respiration cycles with the breathing rate, which is typically on the order of a few breaths per minute. Lung perfusion cycles with the cardiac cycling, which is on the order of 50-120 beats per minute (~0.8 Hz to 2 Hz) for a typical human adult (depending on factors such as physical condition, exertion level, and so forth). Hence, the X-ray system 1 should acquire the constituent lung images of the dynamic lung image 24 faster than these values.

The disclosed imaging system 1 is further configured as described above to perform a delay imaging method or process 100 which includes acquiring the dynamic lung image 24, separating the dynamic lung image 24 into a dynamic respiration image 26 depicting density changes due to respiration, and a dynamic perfusion image 28 depicting density changes due to lung perfusion, at least one of: (i) generating a respiration delay image 30 based on the dynamic respiration image 26; and/or (ii) generating a perfusion delay image 32 based on the dynamic lung perfusion image 28; and displaying the respiration delay image 30 and/or lung the perfusion delay image 32 on the display device 18. In some examples, the method 100 may be performed at least in part by cloud processing. The imaging method or process 100 may, for example, be used to acquire lung perfusion and/or ventilation images.

Figure 2:
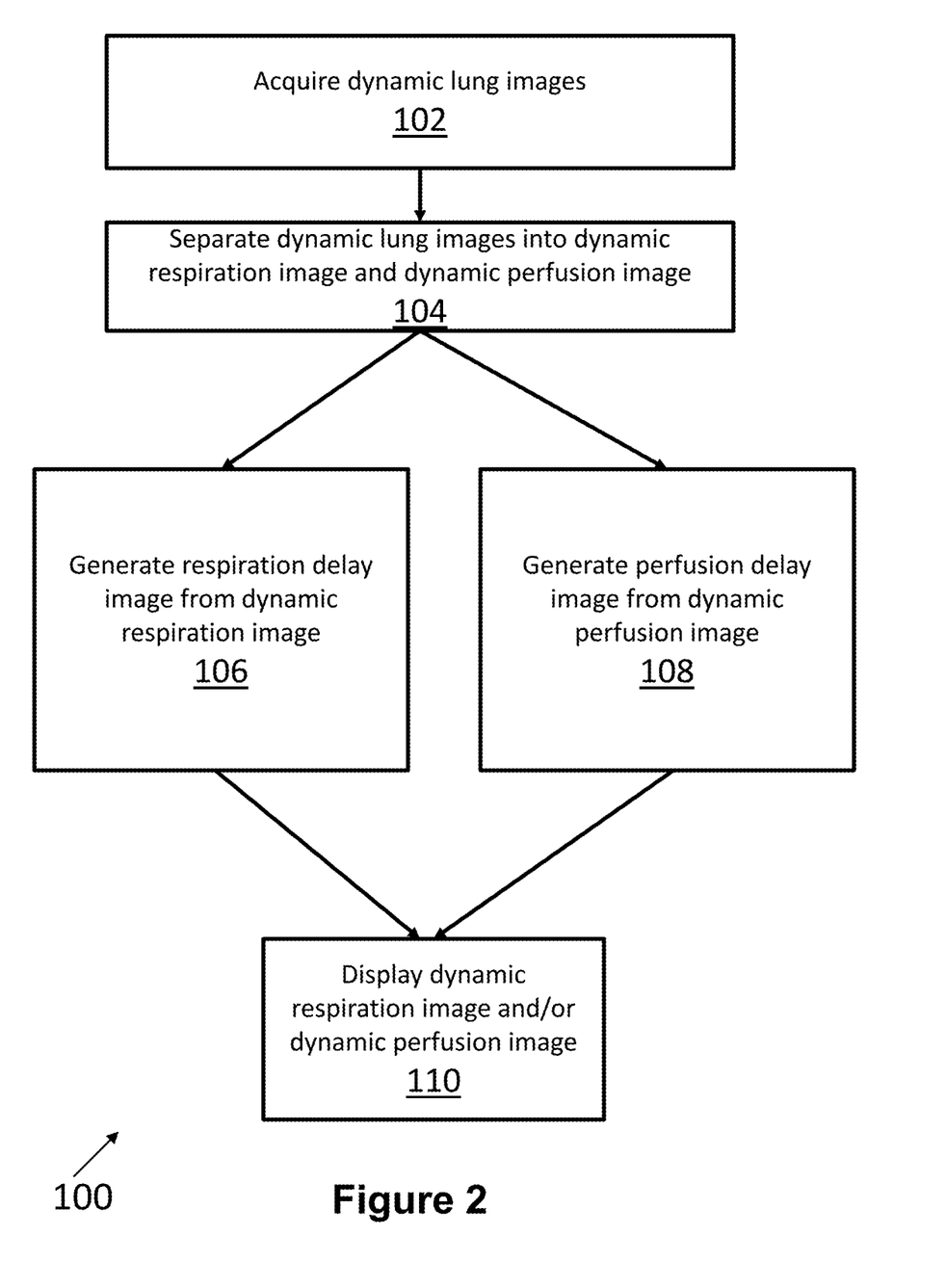
FIG. 2 diagrammatically shows a flowchart of an imaging method using the imaging system of FIG. 1.

With reference to FIG. 2, and with continuing reference to FIG. 1, an illustrative embodiment of an instance of the imaging method 100 is diagrammatically shown as a flowchart. To begin the method 100, the patient P is positioned in the examination region 2 of the medical system 1. At an operation 102, the electronic controller 16 is configured to control the X-ray sources 10 and the X-ray detectors 12 to acquire X-ray imaging data of lungs L over at least one breath using, for example, the electronically switched array of X-ray sources 10, or by using a single X-ray tube of the imaging system 1. The acquired imaging data can comprise a time sequence of images forming one or more dynamic lung images 24 depicting at least one lung L of the patient P. For example, the time sequence of lung images depicts both left and right lungs $L_L$ and $L_R$ of the patient P. In some embodiments, the acquired time sequence of dynamic lung image(s) 24 can be spatially registered.

At an operation 104, the acquired time sequence of dynamic lung image(s) 24 is separated into a dynamic respiration image 26 depicting density changes due to respiration and a dynamic perfusion image 28 depicting density changes due to lung perfusion. In some embodiments, the separating operation 104 includes performing temporal filtering of image elements of the dynamic lung image 24 to separate density changes in a respiratory cycling frequency range into the dynamic respiration image 26 and density changes in a cardiac cycling frequency range into the dynamic perfusion image 28.

At an operation 106, a respiration delay image 30 is generated based on the dynamic respiration image 26, and/or at an operation 108, a perfusion delay image 32 is generated based on the dynamic perfusion image 28.

In some embodiments, the separation operation 104 can include other approaches to separate changes due to respiration and due to perfusion in the acquired time sequence of dynamic lung image(s) 24.

For example, in another illustrative approach, for a time series of previously-registered images, pixel values in the time series of images are denoted as $M_{i,t}$, where i is a spatial index, running over all pixels of the (possibly spatially down-sampled) detector and t is a temporal index. Instead of the separating perfusion and ventilation images via temporal low- and high-pass filtering, a maximum-likelihood approach can be implemented to estimate the desired information, where the a priori knowledge regarding the temporal behavior is coded in a regularization term. Without loss of generality, the to-be-estimated contribution of the blood to the measurements can be denoted as $P_{i,t}$ and the contribution of the ventilation can be denoted as $V_{it}$. These are temporally varying values on top of a static background $B_i$.

The maximum likelihood estimate is usually formulated as an optimization problem, containing a data term (i.e., the unknowns shall fit the measurements) and a regularization term (i.e., the data shall fit a priori knowledge). The data term is usually a least squares type term as shown in Equation (1):

$$\sum_{i,t}(M_{it} - B_i - P_{it} - V_{it})^2 \quad (1)$$

The regularization term often codes temporal smoothness, as shown in Equation (2):

$$R_T(P) = \sum_t (P_{it} - P_{i,t+1})^2 \quad (2)$$

The regularization term often codes spatial smoothness, as shown in Equation (3):

$$R_S(P) = \sum_i \sum_{j \in N_i} (P_{it} - P_{jt})^2 \quad (3)$$

where $N_i$ is the set of neighbors of pixel i. In Equations 2 and 3, the sum of squares is used, but other functions to penalize differences between spatially or temporally neighboring pixels can also be used (i.e., the absolute difference or the Huber function).

In some embodiments, the periodicity with the heart- and/or breathing cycle can also be used. This can be achieved with additional regularization terms of the form as shown in Equation (4):

$$R_C(P, T) = \sum_t (P_{it} - P_{i,t+T})^2 \quad (4)$$

where T is the cycle time. The estimate for P and V is finally obtained by minimizing the cost function as shown in Equation (5):

$$\Delta^2(B, P, V) = \sum_{i,t}(M_{it} - B_i - P_{it} - V_{it})^2 + \alpha_1 R_C(P, T_P) + \quad (5)$$

$$\alpha_2 R_C(V, T_V) + \alpha_3 R_S(P) + \alpha_4 R_S(V) + \alpha_5 R_T(P) + \alpha_6 R_T(V)$$

where $\alpha_k$ denotes regularization parameters which influence how strong the a priori knowledge is. For instance, the temporal smoothness of the ventilation signal is known to be much stronger than the temporal smoothness of the perfusion image. Thus, the natural choice will be $\alpha_5 << \alpha_6$.

In order to simplify the optimization problem, several simplifications are possible. In one example, the approach may operate on single pixels independently and smoothness can be obtained spatial low-pass filtering of either the input data M or the estimated ventilation and perfusion values. In another example, the approach may be split into two optimization problems by performing like in the original approach first a low- and high pass filtering of the measured data. For instance, if $\hat{M}_{it}$ denotes the low-pass filtered data, then the ventilation values $V_{it}$ may be estimated via minimizing as shown in Equation (6):

$$\sum_{i,t}(\hat{M}_{it} - B_i - V_{it})^2 + \alpha_2 R_C(V, T_V) + \alpha_4 R_S(V) + \alpha_6 R_T(V) \quad (6)$$

and correspondingly the perfusion may be estimated from the high-pass filtered measurements $\tilde{M}_{it}$ by minimizing as shown in Equation (7):

$$\sum_{i,t}(\tilde{M}_{it} - P_{it})^2 + \alpha_1 R_C(P, T_P) + \alpha_3 R_S(P) + \alpha_5 R_T(P) \quad (7)$$

The final step of the filtering operations in this embodiment is to condense the temporally resolved estimate $P_{it}$ and $V_{it}$ into perfusion and ventilation maps. This can be done by first averaging the data over the respective cycles. For the perfusion case with a cycle period $T_P$, this is done as according to Equation (8):

$$\bar{P}_i = \frac{1}{N}\sum_{j=0}^{N-1} P_{i,t+jT_P} \quad (8)$$

Next, a temporal gradient is calculated using Equation (9):

$$\bar{P}'_i = \bar{P}_{i+1} - \bar{P}_i \quad (9)$$

The respiration delay image 30 and/or the perfusion delay image 32 are generated using the respiratory cycle period $T_V$.

Figure 3:
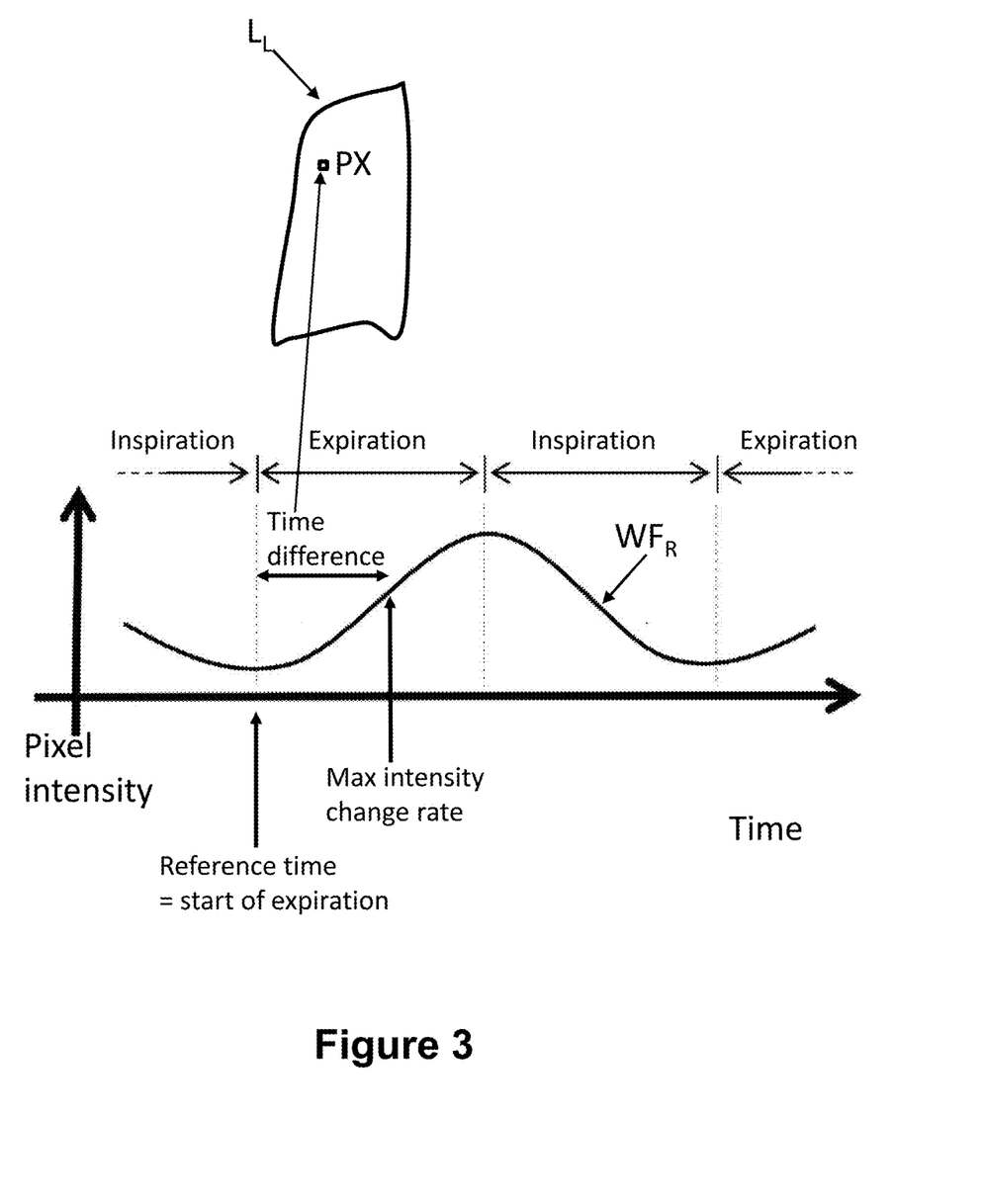
FIG. 3 diagrammatically illustrates an approach for generating a respiration delay image.

With reference to FIG. 3, in some embodiments, the respiration delay image 30 generated at the operation 106 includes an expiration delay image for an expiration phase of a respiratory cycle of the patient P generated by assigning, to each image pixel in a region of interest of the expiration delay image, a time difference between a reference time point for the expiration phase and a time within the expiration phase at which a maximum change rate is observed for the image pixel in the dynamic respiration image 26. FIG. 3 illustrates this for a single illustrative pixel PX of an illustrative region comprising the left lung $L_L$. As used herein, the term "pixel intensity" refers to the attenuation along the ray from the X-ray source 10 to the detector 12, or a surrogate for the attenuation (e.g., the negative logarithm of the measured x-ray intensity, which represents the attenuation up to a constant offset, which is irrelevant for the calculation of the slope). In another example, the detected X-ray transmission from the X-ray source 10 to the detector 12 can be used to represent the attenuation (i.e., a high transmission level is indicative of a low attenuation level). As shown in FIG. 3, the pixel intensity versus time is a waveform $WF_R$ that exhibits a generally sinusoidal shape, with the expiration phase corresponding to the increasing portion of the waveform $WF_R$. In the illustrative example of FIG. 3, the reference time point is the start of expiration. The maximum intensity change rate over the expiration phase corresponds to the point of the waveform $WF_R$ with the largest derivative magnitude, i.e., the largest slope. This is repeated for each pixel of the region of interest (e.g. for each pixel of the left lung $L_L$ in the illustrative example) to produce the respiration delay image 30 in which the pixel value of each pixel of the respiration delay image 30 corresponds to the delay (i.e., to the time difference as indicated in FIG. 3).

In other embodiments, the respiration delay image 30 generated at the operation 106 includes an inspiration delay image for an inspiration phase of a respiratory cycle of the patient P generated by assigning to each image pixel in a region of interest of the inspiration delay image, a time difference between a reference time point for the inspiration phase and a time within the inspiration phase at which a maximum change rate is observed for the image pixel in the dynamic respiration image 26. The "reference time point for the inspiration phase" could (and probably would) be a different time point than the reference time point for the expiration phase. Note that in this case the maximum change rate will correspond to a maximum negative slope (i.e., largest magnitude of the derivative).

To generalize, to determine the inspiration delay image and/or the expiration delay image, at least one respiration waveform of the patient P is received from the respiratory monitor 22 (or a mechanical ventilator 3 configured to provide mechanical ventilation to the patient P). The reference time point is determined based on the at least one respiration waveform. In another example, the reference time point is determined based on temporal periodicity of the dynamic respiration image 26. In some embodiments, when the patient P is receiving mechanical ventilation from the mechanical ventilator 3, a respiratory effort of the patient P can be estimated based on a spatial gradient in the respiration delay image toward or away from a thoracic diaphragm of the patient P.

In some embodiments, the imaging method 100 is repeated to produce a first respiration delay image and a second respiration delay image separated by a time interval, and a change in lung stiffness of the at least one lung L of the patient P is determined over the time interval based on a comparison of the first and second respiration delay images. For example, a difference in lung stiffness between the left lung and the right lung $L_L$ and $L_R$ of the patient P is determined based on a comparison of the left and right lungs $L_L$ and $L_R$ in the respiration delay image. In particular, a lung is stiffer if the delay towards the periphery of the bronchial tree is shorter.

Figure 4:
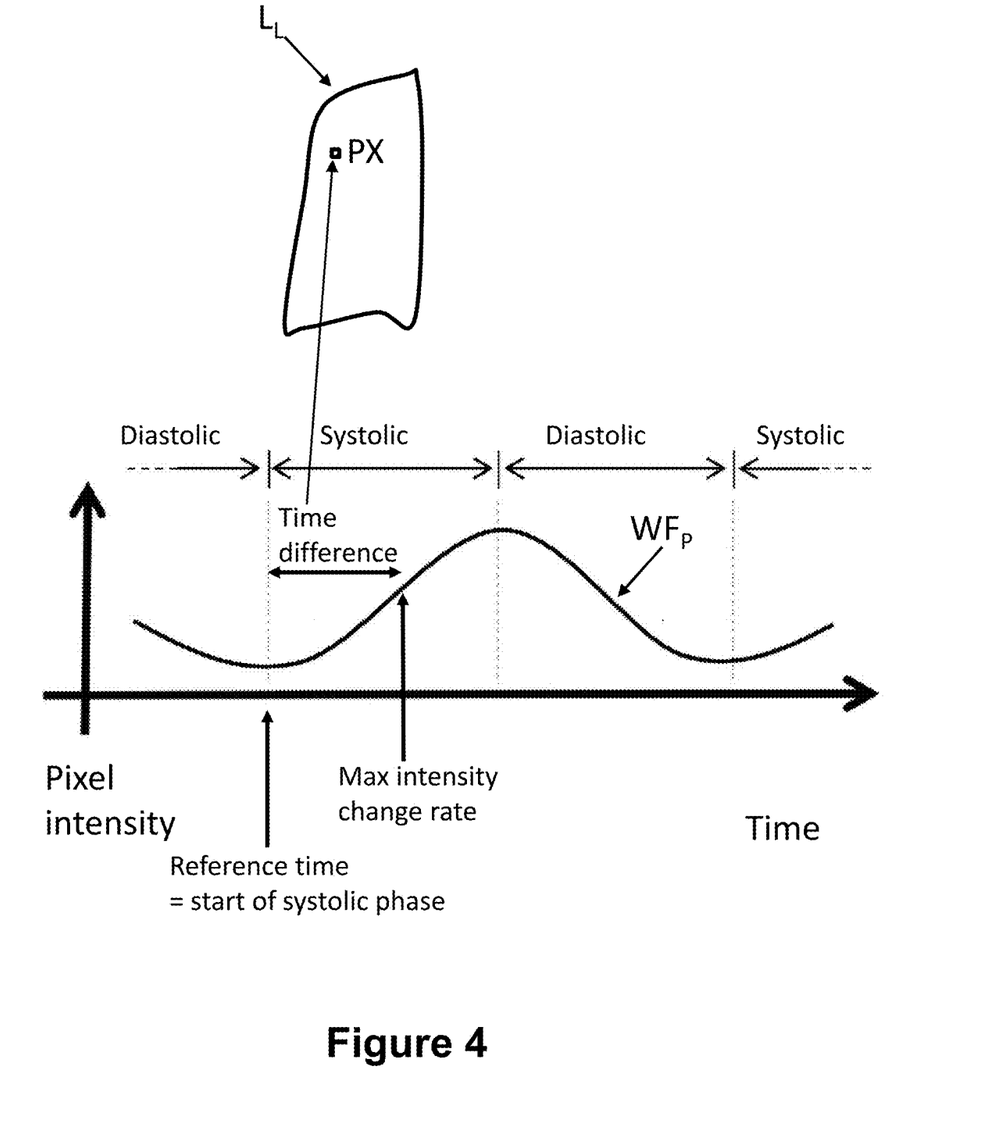
FIG. 4 diagrammatically illustrates an approach for generating a lung perfusion delay image.

With reference to FIG. 4, in some embodiments, the perfusion delay image 32 generated at the operation 108 includes a systole delay image generated for a systole phase of a cardiac cycle of the patient P by assigning to each image pixel in a region of interest of the systole delay image, a time difference between a reference time point for the systole phase and a time within the systole phase at which a maximum change rate is observed for the image pixel in the dynamic perfusion image 28. FIG. 4 illustrates this for a single illustrative pixel PX of an illustrative region comprising the left lung $L_L$. As shown in FIG. 4, the pixel intensity versus time is a waveform $WF_P$ that exhibits a generally sinusoidal shape, with the systolic phase corresponding to the increasing portion of the waveform $WF_P$. In the illustrative example of FIG. 4, the reference time point is the start of the systolic phase. The maximum intensity change rate over the systolic phase corresponds to the point of the waveform $WF_P$ with the largest derivative magnitude, i.e., the largest slope. Again, the term "pixel intensity" refers to attenuation or a surrogate for the attenuation. This is repeated for each pixel of the region of interest (e.g. for each pixel of the left lung $L_L$ in the illustrative example) to produce the lung perfusion delay image 32 in which the pixel value of each pixel of the lung perfusion delay image 32 corresponds to the delay (i.e., to the time difference as indicated in FIG. 4).

In other embodiments, the perfusion delay image 32 generated at the operation 108 includes a diastole delay image generated for a diastole phase of a cardiac cycle of the patient P by assigning, to each image pixel in a region of interest of the diastole delay image, a time difference between a reference time point for the diastole phase and a time within the diastole phase at which a maximum change rate is observed for the image pixel in the dynamic perfusion image 28.

To generalize, to determine the systole delay image and/or the diastole delay image, at least one cardiac cycling waveform of the patient P is received from the ECG or HR sensor 20. The reference time point is determined based on the at least one cardiac cycling waveform. In another example, the reference time point is determined based on temporal periodicity of the dynamic perfusion image 28.

In some embodiments, the imaging method 100 is repeated to produce a first lung perfusion delay image and a second lung perfusion delay image separated by a time interval, and a change in vascular stiffness of pulmonary vasculature of the patient P is determined over the time interval based on a comparison of the first and second lung perfusion delay images. For example, a difference in vascular stiffness of pulmonary vasculature of the left lung $L_L$ and vascular stiffness of pulmonary vasculature of the right lung $L_R$ of the patient P is determined based on a comparison of the left and right lungs in the lung perfusion delay image $L_L$ and $L_R$ of the patient P.

With returning reference to FIG. 2, at an operation 110, the respiration delay image 30 and/or the perfusion delay image 32 is displayed on the display device 18 e.g., side-by-side to enable a clinician to easily compare the ventilation delay and perfusion delay images. In a variant embodiment, the ventilation delay image and the perfusion delay image may be fused to generate a single fused delay image depicting both the ventilation delay and perfusion delay information. For example, the fused delay image could display ventilation delay information extracted from the ventilation delay image in a first color (e.g., green) and the perfusion delay information extracted from the perfusion delay image in a second color (e.g., red). The fused delay image is suitably displayed on the display device 18.

While the processing of FIG. 2 depicts processing to generate both a respiration delay image 30 (operation 106) and a perfusion delay image 32 (operation 108), if the clinical objective is satisfied by only one of these images, then the other can be omitted. For example, if only a respiration delay image 30 is desired then the perfusion delay image operation 108 can be omitted; conversely, if only a perfusion delay image is desired then the respiration delay image operation 106 can be omitted.

The disclosure has been described with reference to the preferred embodiments. Modifications and alterations may occur to others upon reading and understanding the preceding detailed description. It is intended that the exemplary embodiment be construed as including all such modifications and alterations insofar as they come within the scope of the appended claims or the equivalents thereof.

The invention claimed is:

1. A medical imaging device, comprising:
a display device; and
at least one electronic processor programmed to perform an imaging method including:

controlling an associated medical imaging device to acquire a dynamic lung image comprising a time sequence of lung images depicting at least one lung of a patient;

separating the dynamic lung image into a dynamic respiration image depicting density changes due to respiration and a dynamic perfusion image depicting density changes due to lung perfusion;

at least one of: (i) generating a respiration delay image indicating a time after a predetermined respiration reference time at which each image pixel in a region of interest of the dynamic respiration image is at a maximum intensity change rate; and (ii) generating a lung perfusion delay image indicating a time after a predetermined lung perfusion reference time at which each image pixel in a region of interest of the dynamic lung perfusion image is at a maximum intensity change rate; and displaying the respiration delay image and/or the lung perfusion delay image on the display device;

wherein the imaging method includes at least generating the respiration delay image based on the dynamic respiration image; and wherein the respiration delay image includes an expiration delay image for an expiration phase of a respiratory cycle of the patient generated by assigning to each image pixel in the region of interest of the expiration delay image, a time difference between a reference time point for the expiration phase and a time within the expiration phase at which a maximum change rate is observed for the image pixel in the dynamic respiration image.

2. The device of claim 1, wherein the imaging method further includes one of:

receiving at least one respiration waveform from a mechanical ventilator or respiratory monitor operatively connected with the patient, wherein the reference time point is determined based on the at least one respiration waveform; or determining the reference time point based on temporal periodicity of the dynamic respiration image.

3. The device of claim 1, wherein the at least one electronic processor is further programmed to:

repeat the imaging method to produce a first respiration delay image and a second respiration delay image separated by a time interval; and determine a change in lung stiffness of at least one lung of the patient over the time interval based on a comparison of the first and second respiration delay images.

4. The device of claim 1, wherein the time sequence of lung images depicts both left and right lungs of the patient, and the at least one electronic processor is further programmed to:

determine a difference in lung stiffness between the left lung and the right lung based on a comparison of the left and right lungs in the respiration delay image.

5. The device of claim 1, wherein the patient is receiving mechanical ventilation, the at least one electronic processor is further programmed to estimate a respiratory effort of the patient based on a spatial gradient in the respiration delay image toward or away from a thoracic diaphragm of the patient.

6. The device of claim 1, wherein the imaging method includes at least generating the lung perfusion delay image based on the dynamic perfusion image, wherein the perfusion delay image includes a systole delay image generated for a systole phase of a cardiac cycle of the patient by assigning to each image pixel in a region of interest of the systole delay image, a time difference between a reference time point for the systole phase and a time within the systole phase at which a maximum change rate is observed for the image pixel in the dynamic perfusion image.

7. The device of claim 6, wherein the lung perfusion delay image includes a diastole delay image generated for a diastole phase of a cardiac cycle of the patient by assigning, to each image pixel in a region of interest of the diastole delay image, a time difference between a reference time point for the diastole phase and a time within the diastole phase at which a maximum change rate is observed for the image pixel in the dynamic perfusion image.

8. The device of claim 6, wherein the imaging method further includes one of:

receiving at least one cardiac cycling waveform from an electrocardiogram (ECG) or heart rate sensor operatively connected with the patient, wherein the reference time point is determined based on the at least one cardiac cycling waveform; or determining the reference time point based on temporal periodicity of the dynamic perfusion image.

9. The device of claim 6, wherein the at least one electronic processor is further programmed to:

repeat the imaging method to produce a first lung perfusion delay image and a second lung perfusion delay image separated by a time interval; and determine a change in vascular stiffness of pulmonary vasculature of the patient over the time interval based on a comparison of the first and second lung perfusion delay images.

10. The device of claim 6, wherein the time sequence of lung images depict both left and right lungs of the patient, and the at least one electronic processor is further programmed to:

determine a difference in the vascular stiffness of the pulmonary vasculature of the left lung and vascular stiffness of pulmonary vasculature of the right lung based on a comparison of the left and right lungs in the lung perfusion delay image.

11. The device of claim 1, wherein the separation of the dynamic lung image into the dynamic respiration image and the dynamic perfusion image comprises:

performing temporal filtering of image elements of the dynamic lung image to separate density changes in a respiratory cycling frequency range into the dynamic respiration image and density changes in a cardiac cycling frequency range into the dynamic lung perfusion image.

12. A lung imaging method, comprising:

controlling an X-ray imaging device to acquire a dynamic X-ray lung image comprising a time sequence of X-ray lung images depicting at least one lung of a patient;

separating the dynamic lung image into a dynamic respiration image depicting density changes due to respiration and a dynamic perfusion image depicting density changes due to lung perfusion;

at least one of: (i) generating a respiration delay image indicating a time after a predetermined respiration reference time at which each image pixel in a region of interest of the dynamic respiration image is at a maximum intensity change rate; and (ii) generating a lung perfusion delay image indicating a time after a predetermined lung perfusion reference time at which each image pixel in a region of interest of the dynamic lung perfusion image is at a maximum intensity change rate; and displaying the respiration delay image and/or the lung perfusion delay image on a display device;

wherein the imaging method includes at least generating the respiration delay image based on the dynamic respiration image; and wherein the respiration delay image includes an expiration delay image for an expiration phase of a respiratory cycle of the patient generated by assigning to each image pixel in the region of interest of the expiration delay image, a time difference between a reference time point for the expiration phase and a time within the expiration phase at which a maximum change rate is observed for the image pixel in the dynamic respiration image.

13. A medical imaging device, comprising:

a display device; and at least one electronic processor programmed to perform an imaging method including:

controlling an associated medical imaging device to acquire a dynamic lung image comprising a time sequence of lung images depicting at least one lung of a patient;

separating the dynamic lung image into a dynamic respiration image depicting density changes due to respiration and a dynamic perfusion image depicting density changes due to lung perfusion;

generating a lung perfusion delay image based on the dynamic lung perfusion image; and displaying the lung perfusion delay image on the display device;

wherein the lung perfusion delay image includes a systole delay image generated for a systole phase of a cardiac cycle of the patient by assigning to each image pixel in a region of interest of the systole delay image, a time difference between a reference time point for the systole phase and a time within the systole phase at which a maximum change rate is observed for the image pixel in the dynamic perfusion image.

14. The device of claim 13, wherein the imaging method further includes one of:

receiving at least one cardiac cycling waveform from an electrocardiogram (ECG) or heart rate sensor operatively connected with the patient, wherein the reference time point is determined based on the at least one cardiac cycling waveform; or determining the reference time point based on temporal periodicity of the dynamic perfusion image.

15. A medical imaging device, comprising:

a display device; and at least one electronic processor programmed to perform an imaging method including:

controlling an associated medical imaging device to acquire a dynamic lung image comprising a time sequence of lung images depicting at least one lung of a patient;

separating the dynamic lung image into a dynamic respiration image depicting density changes due to respiration and a dynamic perfusion image depicting density changes due to lung perfusion;

generating a lung perfusion delay image based on the dynamic lung perfusion image; and displaying the lung perfusion delay image on the display device;

wherein the lung perfusion delay image includes a diastole delay image generated for a diastole phase of a cardiac cycle of the patient by assigning, to each image pixel in a region of interest of the diastole delay image, a time difference between a reference time point for the diastole phase and a time within the diastole phase at which a maximum change rate is observed for the image pixel in the dynamic perfusion image.

* * * * *